United States Patent [19]
Friedmann

[11] Patent Number: 5,342,151
[45] Date of Patent: Aug. 30, 1994

[54] CUTTING INSERT HAVING A CIRCULAR CUTTING EDGE WITH A CHIP FORMER

[75] Inventor: Jacob Friedmann, Kfar Havradim, Israel

[73] Assignee: Iscar Ltd., Migdal Tefen, Israel

[21] Appl. No.: 6,214

[22] Filed: Jan. 19, 1993

[30] Foreign Application Priority Data

Jan. 20, 1992 [IL] Israel ................. 100703

[51] Int. Cl.$^5$ .............. B23B 27/08; B23B 27/22
[52] U.S. Cl. .................... 407/116; 407/117
[58] Field of Search ............. 407/114, 115, 116, 117

[56] References Cited

U.S. PATENT DOCUMENTS

| | | | |
|---|---|---|---|
| 3,187,406 | 6/1965 | Franko | 407/114 |
| 3,875,663 | 1/1975 | Gustafson et al. | 407/114 |
| 4,273,480 | 6/1981 | Shirai et al. | 407/114 |
| 4,626,140 | 12/1986 | Zweekly et al. | 407/114 |
| 4,844,668 | 7/1989 | Petterson | 407/117 |
| 4,893,969 | 1/1990 | Hessman et al. | 407/114 |
| 4,946,319 | 8/1990 | Lyon et al. | 407/117 |
| 4,988,242 | 1/1991 | Petterson et al. | 407/114 |
| 5,040,930 | 8/1991 | Zinner | 407/117 |
| 5,044,840 | 9/1991 | Fouquer et al. | 407/114 |

FOREIGN PATENT DOCUMENTS 300172 1/1989 European Pat. Off. .

*Primary Examiner*—William E. Terrell
*Attorney, Agent, or Firm*—Pennie & Edmonds

[57] ABSTRACT

The invention relates to a metal cutting tip having an upper face and a curved relief face, defining between them a substantially circular cutting edge. A chip former is located in the upper face and comprises a plurality of substantially radially directed recesses formed in the upper face. The recesses extend from the land at the cutting edge to a substantially centrally located deflector wall. The recesses are positioned to deflect cut metal into a curved rigidized shape and against the deflector wall to cause breaking thereof.

13 Claims, 4 Drawing Sheets

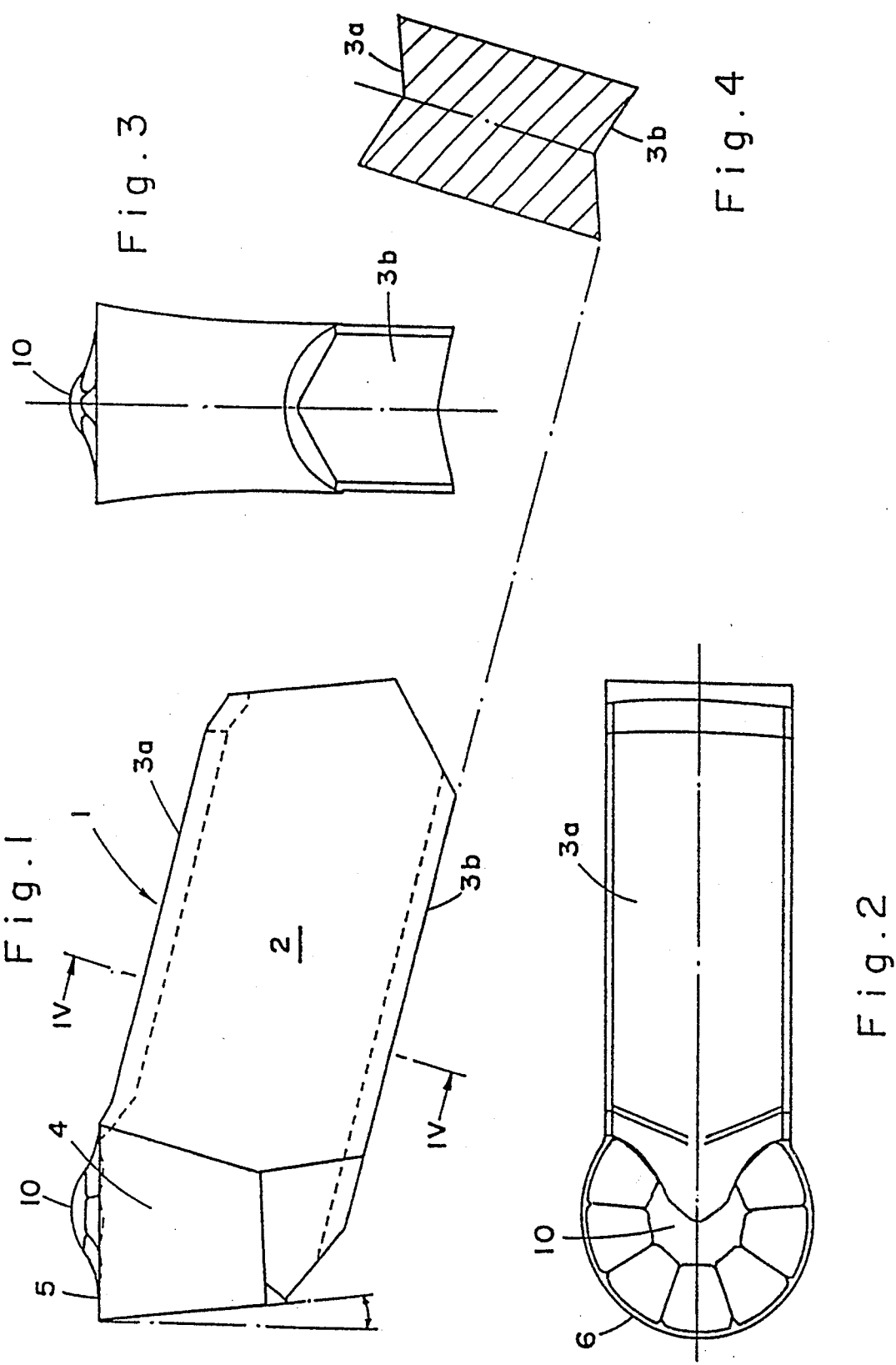

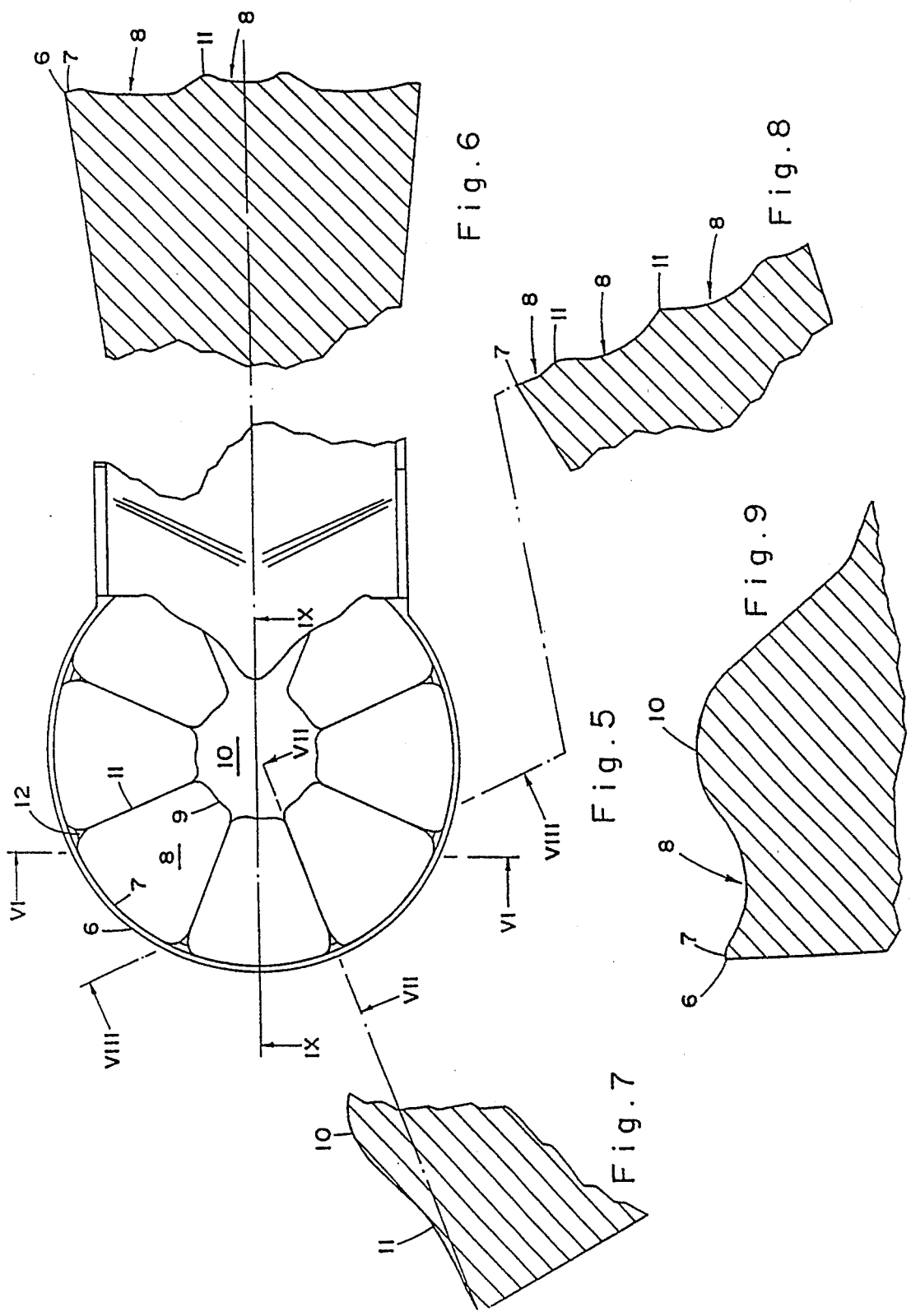

CUTTING INSERT HAVING A CIRCULAR CUTTING EDGE WITH A CHIP FORMER

FIELD OF THE INVENTION

This invention relates to a metal cutting tip for use in metal cutting operations, particularly turning operations. The invention relates in particular to such metal cutting tips having a substantially circular cutting edge.

BACKGROUND OF THE INVENTION

Such metal cutting tips have long been proposed and used, whether the metal cutting tip constitutes an integral part of the metal cutting tool or whether the metal cutting tip forms part of a replaceable cutting insert which is releasably held, for example by screw clamping or by wedge clamping, in an appropriate tool holder. Examples of such metal cutting inserts having circular cutting edges are described in U.S. Pat. Nos. 4,626,140; 4,844,668; 4,946,319 and published European Patent Application No. 300172.

Such cutting tips having circular cutting edges are generally employed in turning operations where the cutting tip is designed to machine a workpiece into a relatively complicated cross-sectional shape, thereby requiring the relative motion of the cutting tip with respect to the workpiece in a continuously curving direction. It will be appreciated that, as a consequence, the extent of contact between the circular cutting edge and the workpiece, as well as the direction of contact (i.e. the angle between a normal to a tangent at the region of contact and the longitudinal axis of the cutting tool) vary with the relative displacement of the cutting tool with respect to the workpiece.

These continuous changes, both in the extent and direction of contact, which are inherent in the use of the circular cutting edge for the purposes indicated, make it increasingly difficult to control the formation and disposal of the chips generated during the turning operation.

Thus, it is known that chips generated with such cutting tips are generally thinner than those generated with cutting tips having a straight cutting edge when the cutting operation takes place under identical conditions of cutting depth and feed rate. Furthermore, it is known that the cross-sectional area of the chips so generated vary in accordance with the extent and direction of contact between the cutting edge and the workpiece. As a consequence of the general thin nature of the chips and their non-uniform cross-sectional area, it has been found very difficult to control the direction of flow of the chips and, in consequence, the provision of effective chip forming and breaking means is rendered more difficult. Thus, as will be readily appreciated, thin chips tend to bend easily and are therefore not readily broken. The provision of conventional means to break the chip and the requirement that these means be available for chips generated in varying directions, carry with it the introduction of an increased resistance to chip flow. This, in turn, leads to an increase in the forces which have to be expended during cutting and also gives rise to vibrations of the cutting system and to a consequent reduction in the surface quality of the machined workpiece.

Known metal cutting tips such as those, for example, described in the prior art referred to above, have not adequately dealt with this problem.

It is therefore an object of the present invention to provide a new and improved cutting tip having a circular cutting edge, in which the above-referred-to problems involved in the formation and disposal of the cutting chips, are significantly reduced.

BRIEF SUMMARY OF THE INVENTION

According to the present invention, there is provided a metal cutting tip having an upper face and a curved relief face defining between them a substantially circular cutting edge; a chip former located in the upper face and comprising a plurality of substantially radially directed recesses formed in the upper face and respectively extending from, and merging smoothly with, a land surface adjacent to and coextensive with said cutting edge to, and merging with, a substantially centrally located deflector wall; adjacent recesses intersecting at substantially radially directed rectilinear ridges, each ridge merging smoothly at one end thereof with a component rake surface extending smoothly from said land surface and, at an opposite end thereof, with said deflector wall.

Preferably, the recesses are substantially equiangularly distributed about the upper face, whilst the circular cutting edge constitutes a sector having defined radii which subtend an angle ranging substantially between 200° to 2800°.

In accordance with a preferred embodiment of the invention, the metal cutting tip is constituted by a replaceable insert.

With metal cutting tips in accordance with the invention it is ensured that, irrespective of the extent and direction of contact between the circular cutting edge and the machined workpiece, the chips formed are directed substantially uniformly towards the centrally located deflector wall and in this way the direction of flow of the chips is at all times controlled. Furthermore, by virtue of the provision of the recesses and their bounding rectilinear ridges, the chips are at all times deformed and are thereby rigidized and, in consequence, even the thinnest chips when so rigidized can be readily broken.

BRIEF DESCRIPTION OF THE DRAWINGS

One embodiment of a metal cutting insert incorporating a metal cutting tip in accordance with the present invention will now be described by way of example and with reference to the accompanying drawings, in which:

FIG. 1 is a side elevation of a cutting insert in accordance with the invention;

FIG. 2 is a top plan view of the insert shown in FIG. 1;

FIG. 3 is a front elevation of the insert shown in FIG. 1;

FIG. 4 is a cross-sectional view of the insert shown in FIG. 1, taken along the line IV:IV;

FIG. 5 is a view on an enlarged scale of the front cutting head portion of the insert shown in FIG. 2;

FIGS. 6, 7, 8 and 9 are respective cross-sectional views of the insert shown in FIG. 5, taken respectively along the lines VI:VI, VII:VII, VIII:VIII and IX:IX;

DETAILED DESCRIPTION OF PREFERRED EMBODIMENT

Figure 11:
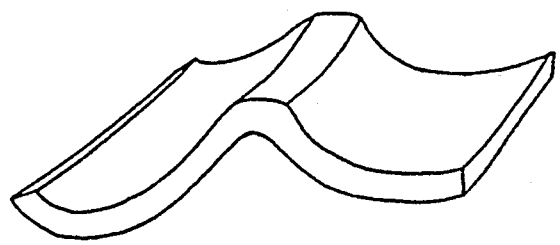
FIGS. 10 and 11 are respective perspective views of chips formed with the cutting insert shown in the preceding drawings, with respectively differing regions of contact between the circular cutting edge of the insert and a workpiece.

As seen in FIGS. 1, 2, 3 and 4 of the drawings, a metal cutting insert I in accordance with the present invention comprises an elongated body portion 2 of generally parallelepipedal shape having upper and lower clamping faces 3a and 3b which are respectively of concave V-shaped construction. A leading end of the insert 1 constituting a cutting head is formed integrally with the body portion 2 and has a curved, substantially conical side face 4 and an upper face 5, there being defined between the side face 4 and the upper face 5 a circular cutting edge 6. The cutting edge 6 defines a major sector of a circle and merges at its ends with the upper clamping face 3a.

As seen clearly in FIGS. 5 through 9 of the drawings, there is formed in the upper face 5 of the cutting head portion of the insert, adjacent the cutting edge 6, an annular K-land surface 7 which merges with a plurality of like, equiangularly spaced, radially directed recesses 8, each recess merging smoothly at an outer perimeter thereof with the adjacent K-land 7 and, at an inner perimeter thereof, with a deflector wall 9. The combination of the K-land 7 and the radial recesses 8 impart a positive cutting geometry to the insert. The deflector walls 9 associated with the recesses 8 together constitute the outer walls of a raised, substantially frustoconical cap-like projection 10 of substantially polygonal cross-sectional shape. As can be clearly seen from FIGS. 6, 7, 8 and 9 of the drawings, each recess 8 slopes downwardly from its associated K-land 7 and then slopes upwardly towards the deflector wall 9. Adjacent recesses 8 intersect in respective radial rectilinear ridge lines 11, each recess 8 sloping downwardly from a pair of adjacent ridge lines 11. Each ridge line 11 merges smoothly at an outer end thereof with a component rake surface 12 which, in its turn, extends smoothly from the K-land 7 and, at its inner opposite end, the radial ridge line 11 merges smoothly with the deflector wall 9.

As can be seen, the diameter of the upper circular surface of the cutting head is greater than the width of the body portion 2. The curved, conical side face 4 of the cutting head constitutes a side relief surface of the insert.

Figure 12:
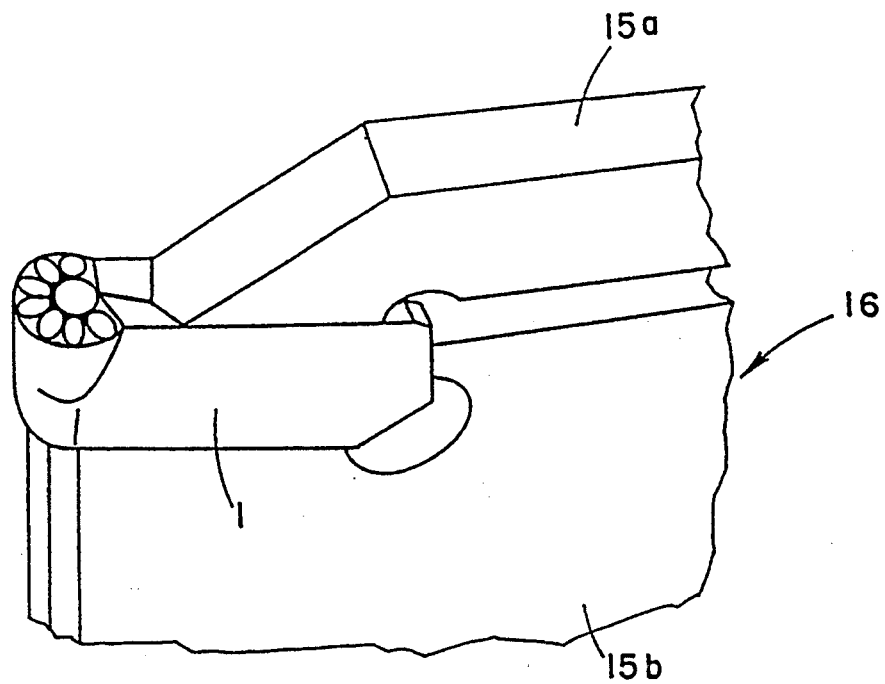
FIG. 12 is a perspective view of the insert shown in the preceding drawings, when held in an appropriate tool holder.
Figure 13:
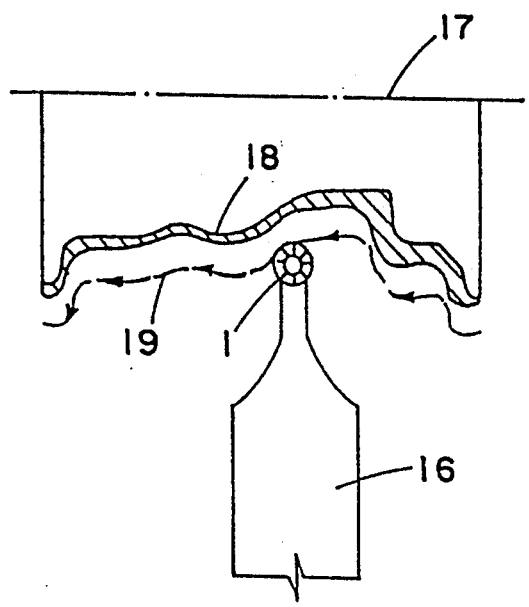
FIG. 13 shows schematically the operational displacement of a cutting tool such as that shown in FIG. 12, with respect to a workpiece.

In use, the cutting insert just described with reference to FIGS. 1 through 9 of the drawings, can, as shown in FIG. 12 of the drawings, be securely held between clamping jaws 15a and 15b of a tool holder 16. The insert 1 clamped in the tool holder 16, as schematically shown in FIG. 13 of the drawings, can be arranged to turn a workpiece 17 so as to machine a complex cross-sectional shape 18, the cutting edge following an irregular path denoted by the chain dotted line 19. It will be readily seen that, at different positions along the path 19, contact between the circular cutting edge and the workpiece takes place along differing regions and extents of contact and with differing directions of contact. In the past, this variation in the extent and directions of contact have rendered it very difficult to control the formation and disposal of the chips formed during the turning operation.

With the cutting insert as just described, however, when contact between the cutting edge and the workpiece is along an arc which is tangentially perpendicular to the longitudinal axis of the cutting tool, all chips which are formed will flow normally towards the deflector walls 9 and upon contacting the walls, are deflected therefrom away from the workpiece. Under these circumstances, where the chip is of a width less than the distance between two radial ridges and the arc of contact between the cutting edge and the workpiece extends between the pair of adjacent radial ridges, then the chip which is formed will be of substantially concave shape, corresponding to the shape of the recess and such a concavedly-shaped chip will be to a certain degree rigidized, thereby facilitating its subsequent breaking after having been deflected by the deflector wall 9.

Figure 10:
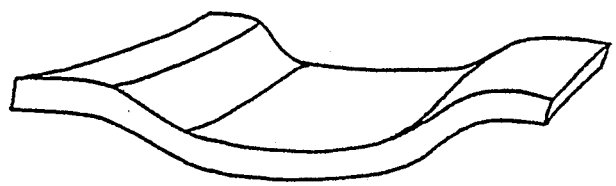

Where, however, the arc of contact extends beyond two adjacent ridges and, in consequence, the chip is wider than the distance between two adjacent ridges, the central portion of the chip will be concave corresponding to the concavity of the central recess, whilst the outer portions of the chip will be deformed by the ridges over which it passes and the chip as a whole will be as shown in FIG. 10 of the drawings.

Where, however, the arc of contact is relatively narrow and is disposed opposite one of the radial ridges, then a correspondingly narrow chip will be formed which will be centrally deformed as shown in FIG. 11 of the drawings.

In all these cases, however, the deformation of the chip results in its rigidizing and thus even the thinnest chips which are formed as a result of the use of a circular cutting edge are sufficiently rigidized so as to ensure its ultimate breaking after having been deflected by the centrally disposed deflector wall.

Where, however, the arc of contact of the circular cutting edge and the workpiece is tangentially transverse to the longitudinal axis of the cutting edge, the chips thus formed will, after passing over the K-land, be diverted by the radial side walls of the recesses (which side walls terminate in the radial ridges) and be diverted by them towards the centrally located deflected wall and thus in these cases too, the chips, after having undergone one or other form of rigidizing, will be directed in the same direction.

Thus, in all cases the chips flow uniformly towards the central deflector walls, and are rigidized by the recess and ridge construction.

The fact that the insert is provided with positive cutting edge geometry ensures that chip formation takes place with minimal energy expenditure. Similarly, the fact that the deformation of the chips occurs immediately after they have left the cutting edge also ensures that minimum energy expenditure is involved and minimizes the dangers of vibration and the consequent deleterious effect on the machined surface.

The cutting insert can have a cutting head of varying diameters whilst its cutting edge constitutes a sector having defining radii which subtend an angle of between substantially 200° to 280°. Each pair of adjacent ridges defines between them an angle which ranges between 35° to 65°. The land surface can have a width which ranges between 0.05 to 0.2 mm, whilst the component rake surfaces have a radial extent which ranges between 0.3 to 0.8 mm.

Whilst in the arrangement described above the invention has been applied to a replaceable cutting insert which can either be screw clamped or wedge clamped in a tool holder, it will be readily appreciated that the invention is equally applicable to a disc-like insert which can be screw clamped on a tool holder or alternatively, to a cutting tip which can form an integral part of a tool holder.

I claim:

1. A metal cutting tip having an upper face and a curved relief face defining between them a substantially circular cutting edge; a chip former located in said upper face and comprising a plurality of substantially radially directed recesses formed in said upper face and respectively extending from and merging smoothly with, a land surface adjacent to and coextensive with said cutting edge to, and merging smoothly with, a substantially centrally located deflector wall; adjacent recesses intersecting at substantially radially directed rectilinear ridges, each ridge merging smoothly at one end thereof with a component rake surface extending smoothly from said land surface and at an opposite end thereof, with said deflector wall, and wherein each of said recesses defines a single curved surface extending from said land surface to said deflector wall.

2. A metal cutting tip according to claim 1, wherein said recesses are substantially equiangularly distributed about said upper face.

3. A metal cutting tip according to claim 1, wherein said circular cutting edge constitutes a sector having radii which define an angle ranging substantially between 200° to 280°.

4. A metal cutting tip according to claim 1, wherein each pair of adjacent ridges defines an angle which ranges between 35° to 65°.

5. A metal cutting tip according to claim 1, wherein said land surface has a width which ranges between 0.05 to 0.2 mm.

6. A metal cutting tip according to claim 5, wherein each component rake surface has a radial extent which ranges between 0.3 to 0.8 mm.

7. A metal cutting tip according to claim 1, wherein there is formed centrally in said top face a raised, substantially frustoconical cap-like projection wherein said deflector wall constitutes a side wall thereof.

8. A metal cutting tip according to claim 7, wherein said projection is of substantially regular polygonal cross-sectional shape.

9. A metal cutting tip according to claim 7, wherein said projection has a diameter which ranges between 0.2 to 0.3× the diameter of the top surface of said tip.

10. A metal cutting tip according to claim 1 and constituting a replaceable insert.

11. A metal cutting insert according to claim 10, and comprising a cutting head comprising said upper and side faces and an integrally formed body portion adapted to be releasably clamped in a tool holder.

12. A metal cutting tip having an upper face and a curved relief face defining between them a substantially circular cutting edge; a land surface adjacent to and coextensive with said cutting edge; a deflector projection located substantially centrally of said upper face and projecting upwardly thereof to define a circular facing side deflector wall; and a chip former located in said upper face and comprising a plurality of substantially radially directed recesses formed in said upper face and respectively extending from and merging smoothly, radially outwardly thereof, with said land surface and merging smoothly, radially inwardly thereof, with said side deflector wall; adjacent recesses intersecting at substantially radially directed rectilinear ridges, each ridge merging smoothly at one end thereof with a component rake surface extending smoothly from said land surface and at an opposite end thereof with said deflector wall, and wherein each of said recesses defines a single curved surface extending from said land surface to said deflector wall.

13. A metal cutting tip according to claim 12 wherein said projection is of a raised, substantially frustoconical cap-like form.

* * * * *